United States Patent [19]

Reynolds

[11] Patent Number: 4,984,319
[45] Date of Patent: Jan. 15, 1991

[54] METHOD OF MANUFACTURING A LAMINATED NUT HAVING CAGE WITH NESTED FINGERS

[75] Inventor: Richard L. Reynolds, Grosse Pointe Shores, Mich.

[73] Assignee: Pac-Fasteners, (an affiliate of Peterson American Corporation), Southfield, Mich.

[21] Appl. No.: 494,472

[22] Filed: Mar. 16, 1990

Related U.S. Application Data

[62] Division of Ser. No. 388,658, Aug. 2, 1989, Pat. No. 4,940,377.

[51] Int. Cl.⁵ .............................................. B21D 53/24
[52] U.S. Cl. ............................................................ 10/86 A
[58] Field of Search ............... 10/72 R, 86 R, 86 A; 29/505, 509, 513; 411/260, 261, 266, 267, 288, 290, 427, 432

[56] References Cited

U.S. PATENT DOCUMENTS

| | | | |
|---|---|---|---|
| 1,874,829 | 8/1932 | Swanstrom | 10/86 A |
| 1,990,718 | 2/1935 | Swanstrom | 10/86 A |
| 2,090,125 | 8/1937 | Hower | 10/86 R |
| 2,320,032 | 5/1943 | Danforth | 10/86 A |
| 2,659,406 | 11/1953 | Locke | 10/86 R |
| 2,784,428 | 3/1957 | Curran | 10/86 A |
| 3,233,262 | 2/1966 | Vollman | 10/86 A |
| 3,461,935 | 8/1969 | Monticelli | 411/259 |
| 4,383,787 | 5/1983 | Reynolds | 411/432 X |

FOREIGN PATENT DOCUMENTS 2829385 2/1979 Fed. Rep. of Germany ...... 411/285

Primary Examiner—E. Michael Combs
Attorney, Agent, or Firm—Harness, Dickey & Pierce

[57] ABSTRACT

The method of manufacture and product by process of a laminated nut comprising a plurality of conical spring discs or spring washers and a cage for receiving and holding the spring discs in a stacked, aligned relationship to define a central opening threaded to be matably received upon an associated threaded bolt, with the cage comprising a plurality of fingers nested within slots defined in the flats of the spring discs and including protrusion means at one axial end of the nut cage to preclude gripping of the nut by a wrenching tool at the one axial end.

19 Claims, 2 Drawing Sheets

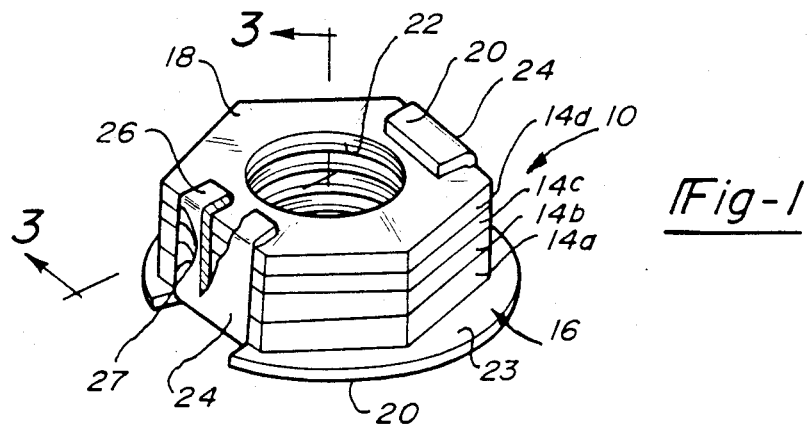
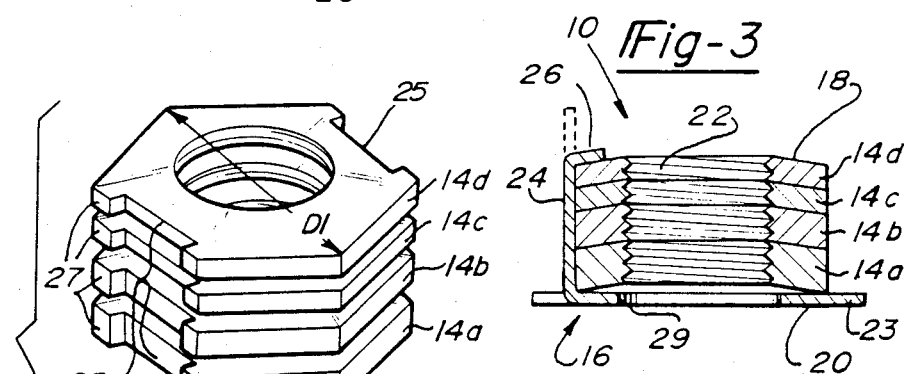
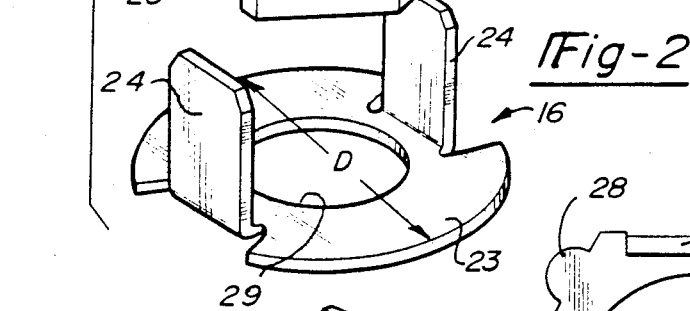
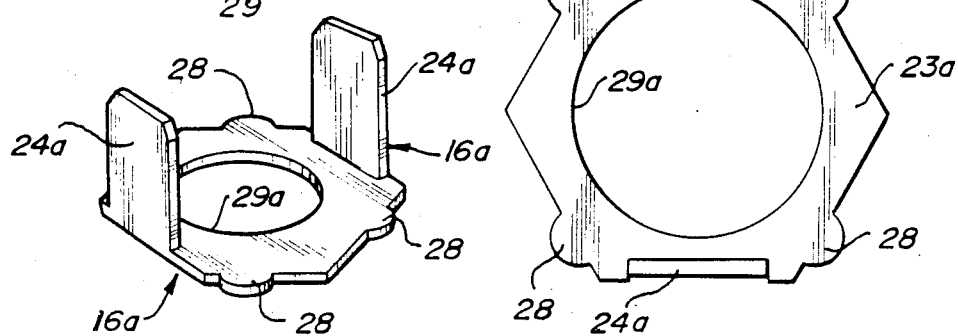
Fig-1
Fig-3
Fig-2
Fig-4
Fig-5

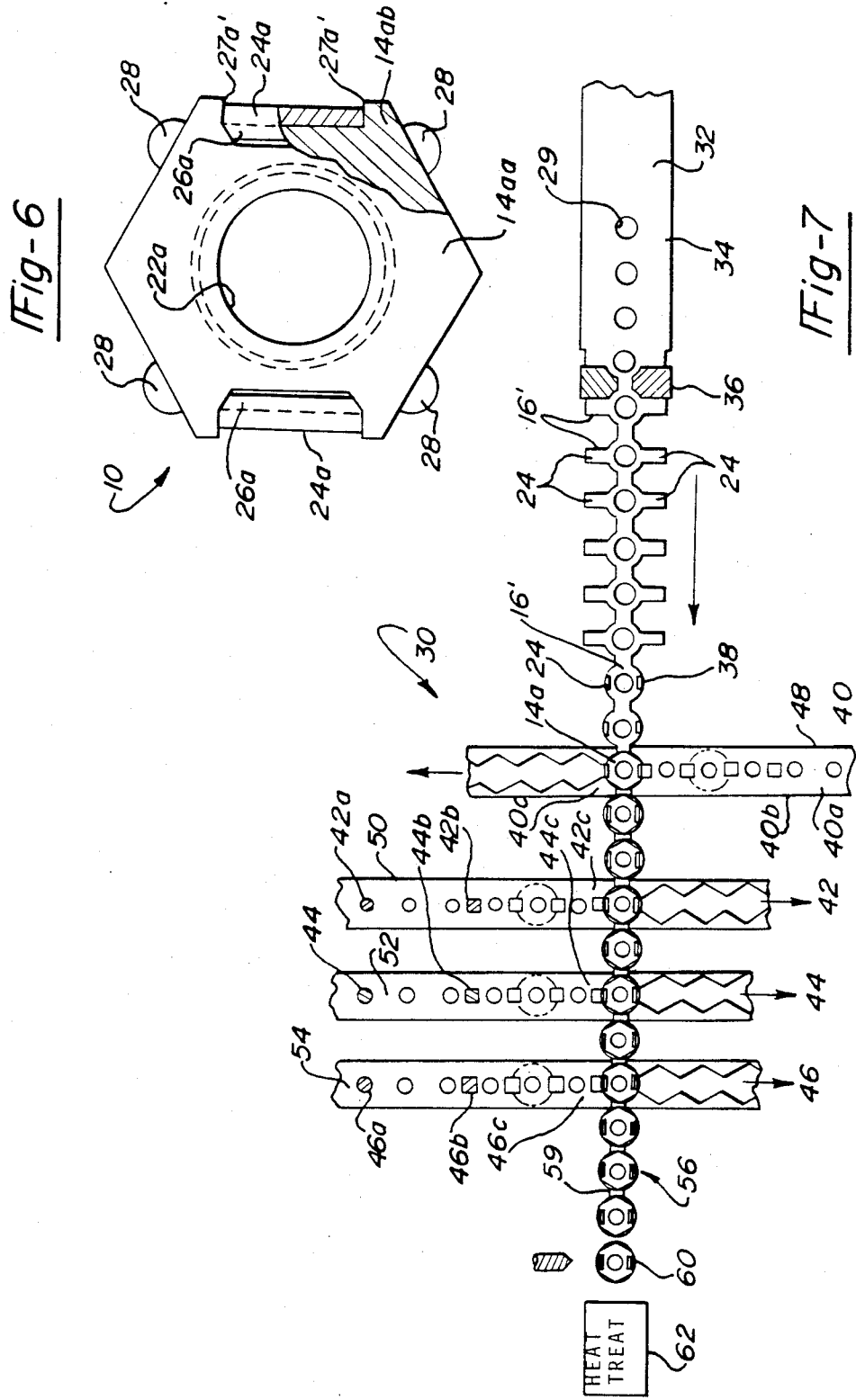

METHOD OF MANUFACTURING A LAMINATED NUT HAVING CAGE WITH NESTED FINGERS

This is a division of U.S. patent application Ser. No. 388,658, filed Aug. 2, 1989, U.S. Pat. No. 4,940,377.

SUMMARY BACKGROUND OF THE INVENTION

The present invention relates to free spinning laminated nuts utilizing laminations of hex shaped hardened coned-disc springs, having a central opening tapped to match threads on an associated bolt and a method for making such nuts.

Such laminated nuts have stacked aligned multiple discs retained by a steel outer cage. Examples of prior laminated nut structures are shown and discussed in U.S. Pat. No. 4,383,787, issued to Reynolds on May 17, 1983.

The noted laminated nuts are free running on the bolt until seated. A locking force between the nut and bolt results from the application of additional torque and rotation after initial seating. The additional torque compresses and partially flattens the conical spring discs or spring washers whereby a mechanical interference occurs between the thread flanks of the nut and bolt; it is believed that this is at least partially due to the change in hole size of the nut as the conical discs flatten. The resultant thread interference and retained spring load between thread flanks resists unloading that might otherwise occur as a result of tensile or vibrational loads. Thus, the independently loaded conical spring threaded segments when flattened create a thread interference that tends to lock the nut against rotation or loosening when subject to such loads.

Laminated nuts have been constructed of a hexagonal shape facilitating the application and use of wrenching tools similar to conventional, solid nut constructions. Such previous designs of laminated lock nuts have used symmetrical cages with six fingers or petals, one operative with each of the flats of the laminated, hexagonal configuration. At the same time each of the cage fingers overengaged the exterior surface of the associated flat. With such a construction the wrenching tool engaged the cage fingers and the application and/or removal torque was applied to the laminated nut through the cage. In addition the cage, literally covering the exterior surface of the stacked discs or laminations was somewhat difficult and costly to manufacture and also added to the cost of assembling the discs within the cage.

In the present invention a cage is provided having fewer than six fingers, with each of the fingers being nested in a slot or groove in the surface of the associated flat of the disc. As will be seen this construction provides structural and manufacturing advantages leading to an improved laminated nut.

Therefore it is an object of the present invention to provide a unique laminated nut structure having a cage with fingers located in slots or grooves in the flats of the stacked laminations or discs.

It is another object of the present invention to provide a unique laminated nut structure having fewer fingers than flats on the laminations and with the fingers adapted to be located in slots or grooves in the flats of the stacked laminations.

It is still another object to provide a unique method of manufacturing laminated nuts of the present invention.

It is still another object to provide a unique laminated nut of an improved construction.

Other objects, features, and advantages of the present invention will become apparent from the subsequent description and the appended claims, taken in conjunction with the accompanying drawings, in which:

FIG. 1 is a pictorial top view with some parts broken away of a laminated nut embodying features of the present invention, including a plurality of coned-disc springs held by a cage;

FIG. 2 is an exploded pictorial view of the laminated nut of FIG. 1 depicting the coned disc springs and cage in an assembled condition;

FIG. 3 is a sectional view of the nut of FIG. 1 taken generally in the direction of the arrows 3—3 in FIG. 1;

FIG. 4 is a pictorial view of a different form of cage for a laminated lock nut of the present invention;

FIG. 5 is a top elevational view of the modified cage structure of FIG. 4;

FIG. 6 is a top elevational view of a laminated lock nut of the present invention utilizing the modified cage construction of FIGS. 4 and 5; and FIG. 7 is a generally schematic view depicting a method of manufacturing the laminated lock nut of FIG. 1.

DETAILED DESCRIPTION

Looking now to the drawings, a laminated nut 10, embodying features of the present invention, is shown and includes a series of hex shaped hardened coned, disc springs 14a–d which are held in an assembled, stacked relationship via a cage 16. The laminated nut 10 has a top side 18 and a bottom side 20. As noted in order to secure the desired locking feature between the nut 10 and an associated bolt, the nut 10 should be mounted onto the bolt with the bottom side 20 being the leading end of the nut 10 as it is threaded onto the bolt and hence with the top side 18 being the trailing end. As shown in the drawings, the laminations or springs 14a–d define a central bore 22 which is threaded to be matably, threadably received upon the bolt. Thus when properly installed, the laminations or disc springs 14a–d are initially dished axially outwardly from the bottom side 20 towards the top side 18.

The cage 16 can be formed of sheet metal and includes a bottom plate portion 23 and a plurality of axially extending fingers 24. The cage 16 has a clearance opening 29 in line with and larger than threaded bore 22 to permit easy passage of the associated bolt. In one form of the invention both the cage 16 and disc springs 14a–d were constructed of an AISI 1050 or AISI 1070 spring steel and hardened to a Rockwell hardness of between around Rc 39 and Rc 45. In a preferred form of the invention two such fingers 24 are utilized as shown. However, certain advantages of the invention can be realized where two or more such fingers are used.

In the form of the invention shown, two axially extending fingers 24 are circumferentially arranged on diametrically opposite sides of the plate portion 23 with each being in line with two corresponding diametrically opposite flats of the hexagonally shaped outer surface of the laminations or disc springs 14a–d. Each of the disc springs 4a–d has its two opposite flats grooved or slotted which, when assembled, define two continuous axially extending slots 25. The radial depth of the slots 25 is greater than the thickness of the fingers 24 such that the fingers 24 will be nested or located substantially completely in the slots 25. The outer end portions of the fingers 24 are folded radially inwardly to define retaining tabs 26 which grip the uppermost disc spring 14d and thereby hold the components together.

In order to inhibit improper orientation of the laminated nut 10 onto the associated bolt, the plate portion 23 is provided to be of a generally circular contour having a diameter D generally equal to the distance D1 across the peaks of the disc springs 14a-d.

With this construction the nut 10 cannot be gripped by a wrench from the bottom side 20 and hence installation of the nut 10 in a reverse direction onto a bolt is precluded.

Note that the fingers 24 are completely nested within the associated slots 25. Thus the nut 10 will be gripped along the flats of the hardened disc springs 14a-d facilitating the application and use of wrenching tools similar to conventional, solid nut constructions.

In order to hold the fingers 24 within the slots 25, the outer corners 27 (FIG. 2) of the slots 25 are skived or deformed slightly inwardly as at 27' (FIG. 1) to partially close the slots 25 whereby the fingers 24 will be retained therein.

As will be seen, both the disc springs 14a-d and the cage 16 are in an unhardened condition before assembly, i.e. as in FIG. 2. After assembly the central bore 22 is tapped and the assembled nut 10 is then thermally hardened. As noted in prior cage constructions, the fingers overengaged each of the flats of the disc springs and hence enclosed the disc springs. This made the thermal hardening process of the assembled nut more difficult and at times resulted in non-.uniform hardening of the disc springs. In the present invention, the cage 16 is generally open facilitating the attainment of a more uniform hardness of the disc springs 14a-d from heat treatment of the nut 10.

Another form of cage and nut assembly is shown in FIGS. 4-6 where components similar to like components in the embodiment of FIGS. 1-3 are given the same numerical designation with the addition of the letter postscript "a". For purposes of simplicity all components will not be described and the description of the similarly numbered counterpart in FIGS. 1-3 can be considered to apply. The embodiment of FIGS. 4-6 shows another cage structure designed to preclude improper orientation of the laminated nut onto the associated bolt. Here the cage 16a has a bottom plate portion 23a which is hexagonally shaped to generally match the shape of the disc springs 14a-d. The plate portion 23 is provided with a plurality of radially outwardly extending ears or protrusions 28. The protrusions 28 prevent gripping of the nut 10a from the bottom side 20a thereby precluding an operator from installing the laminated nut 10a in a reverse or improper direction on the associated bolt. While four protrusions 28 are provided a plurality of protrusions 28 more or less than four could be effectively used.

The protrusions 28 and the circular plate portion 23 of enlarged area also provide for obvious visual orientation by the operator and limit driving engagement during installation with hand service tools such as box, open ends or adjustable wrenches.

As can be seen from the diagram of FIG. 7 the laminated nut 10 of the present invention can be manufactured by a direct and simple process. The laminated nut 10 of FIGS. 1-3 is shown being manufactured; it is understood, however, that the nut 10a with modified cage 16a could be similarly manufactured.

Looking now to FIG. 7 a multistation machine 30 is schematically shown. A flat strip or stock of material 32 is fed into the machine 30 from one side for forming the cage 16. At a first station 34 the clearance opening 29 in the bottom plate portion 23 is punched. Next one half of two adjacent sides of cage blanks 16' are blanked at blanking station 36 to form the fingers 24 which are formed in two successive blanking steps. At station 38 the fingers 24 are folded upwardly from the bottom plate portion 23 to extend axially therefrom to the orientation shown in FIG. 2.

At stations 40, 42, 44 and 46, disc springs 14a-d are formed and assembled one at a time into the partially formed cage 16' which is open as shown in FIG. 2. Thus, at station 40 a flat strip or stock of material 48 is fed transversely to the direction of feed of the strip 32. The opening for the central bore 22 is first punched at punch station 40a. Next the slots 25 are punched at a second, square Punch station 40b. At a blanking station 40c, the first disc spring 14a is blanked out from the strip 48 and assembled into the open cage 16'.

The same procedure is followed at stations 42-46. Thus, at station 42 a flat strip or stock of material 50 is fed transversely to the direction of feed of the strip 32. The opening for the central bore 22 is first punched at punch station 42a. Next the slots 25 are punched at a second, square punch station 42b. At a blanking station 42c, the second disc spring 14b is blanked out from the strip 50 and assembled into the open cage 16'.

At station 44 a flat strip or stock of material 52 is fed transversely to the direction of feed of the strip 32. The opening for the central bore 22 is first punched at punch station 44a. Next the slots 25 are punched at a second, square punch station 44b. At a blanking station 44c, the third disc spring 14c is blanked out from the strip 52 and assembled into the open cage 16'.

Finally, at station 46 a flat strip or stock of material 54 is fed transversely to the direction of feed of the strip 32. The opening for the central bore 22 is first punched at punch station 46a. Next the slots 25 are punched at a second, square punch station 46b. At a blanking station 46c, the fourth disc spring 14d is blanked out from the strip 54 and assembled into the open cage 16'.

Next the assembled nut is moved to a folding station 56 where the upper ends of the fingers 24 are folded radially inwardly to form the retaining tabs 26. At the same time the corners 27 of the disc springs 14a-d can be skived or deformed inwardly to form the corners 27' partially closing the slots 25 to retain the fingers 24 within the slots 25 as previously described.

Next the bridge of material 59 connecting adjacent ones of the cages 16 is severed at station 58 to separate each nut 10 from the strip of material 32. Next the nut 10 is tapped at a station 60 to define the threaded central bore 22. The tapping station 60 can be a part of the multistate machine 30 or be at a separate machine. Next the assembled nut 10 is heat treated to the desired hardness at the heat treat station 62 completing the manufacture of nut 10.

Thus it can be seen that the unique, improved, laminated nut structure of the present invention can be efficiently manufactured by the above described process.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a laminated nut comprising a plurality of conical spring discs, a cage for receiving and holding said spring discs in a stacked, aligned relationship to define a central opening threaded to be matably received upon an associated threaded bolt, said cage including a bottom plate portion and a plurality of axially extending fingers cooperating with said plate portion to hold said spring discs in a stacked, aligned relationship, said spring discs having a plurality of circumferentially disposed flats, the method of manufacture comprising the steps of: providing a continuous strip of flat stock, forming a plurality of blanks connected together by a bridge of material, forming each blank to have said bottom plate portion with said fingers in a generally common plane, folding said fingers to extend axially from said bottom plate portion, forming said spring discs with axially extending slots in said flats, locating said spring discs onto said bottom plate portion with said fingers in said slots, folding the upper end of said fingers radially inwardly generally against the adjacent one of said disc springs to form retaining tabs holding said spring discs to said cage, and severing said bridge to remove the formed laminated nut.

2. The method of claim 1 with said fingers being initially formed in said common plane to extend generally transversely to said bridge.

3. In a laminated nut comprising a plurality of conical spring discs, a cage for receiving and holding said spring discs in a stacked, aligned relationship to define a central opening threaded to be matably received upon an associated threaded bolt, said cage including a bottom plate portion and a plurality of axially extending fingers cooperating with said plate portion to hold said spring discs in a stacked, aligned relationship, said spring discs having a plurality of circumferentially disposed flats, the method of manufacture comprising the steps of:

providing a continuous strip of flat stock, forming a plurality of blanks connected together by a bridge of material, forming each blank to have said bottom plate portion with said fingers in a generally common plane, forming said spring discs with said slots, locating said spring discs onto said bottom plate portion, locking said spring discs to the associated one of said blanks by moving said fingers into said slots and folding the upper ends of said fingers radially inwardly generally against the adjacent one of said disc springs to form retaining tabs holding said spring discs to said cage.

4. The method of claim 3 comprising the steps of severing said bridge after said upper ends of said fingers have been folded.

5. The method of claim 3 with said fingers being initially formed in a common plane with and extending generally transversely to said bridge.

6. The method of claim 4 with said fingers being initially formed in a common plane with and extending generally transversely to said bridge.

7. In a laminated nut comprising a plurality of conical spring discs, a cage for receiving and holding said spring discs in a stacked, aligned relationship to define a central opening threaded to be matably received upon an associated threaded bolt, said cage including a bottom plate portion and a plurality of axially extending fingers cooperating with said plate portion to hold said spring discs in a stacked, aligned relationship, said spring discs having a plurality of circumferentially disposed flats, said laminated nut constructed by the process comprising the steps of:

providing a continuous strip of flat stock, forming a plurality of blanks connected together by a bridge of material, forming each blank to have said bottom plate portion with said fingers in a generally common plane, folding said fingers to extend axially from said bottom plate portion, forming said spring discs with axially extending slots in said flats, locating said spring discs onto said bottom plate portion, moving said fingers in said slots, folding the upper ends of said fingers radially inwardly generally against the adjacent one of said disc springs to form retaining tabs holding said spring discs to said cage.

8. The process of claim 6 comprising the step of severing said bridge after said upper ends of said fingers have been folded.

9. The process of claim 7 further comprising the step of forming protrusion means at one axial end of said cage to preclude gripping of the nut by a wrenching tool at said one axial end.

10. In a laminated nut comprising a plurality of conical spring discs, a cage for receiving and holding said spring discs in a stacked, aligned relationship to define a central opening threaded to be matably received upon an associated threaded bolt, said cage including a bottom plate portion and a plurality of axially extending fingers cooperating with said plate portion to hold said spring discs in a stacked, aligned relationship, said spring discs having a plurality of circumferentially disposed flats, said laminated nut constructed by the process comprising the steps of:

providing a continuous strip of flat stock, forming a plurality of blanks connected together by a bridge of material, forming each blank to have said bottom plate portion with said fingers, forming said spring discs with axially extending slots in said flats, locating said spring discs onto said bottom plate portion, locking said spring discs to the associated one of said blanks by moving said fingers in said slots and folding the upper ends of said fingers radially inwardly generally against the adjacent one of said disc springs to form retaining tabs holding said spring discs to said cage.

11. The method of claim 10 comprising the steps of severing said bridge after said upper ends of said fingers have been folded.

12. The method of claim 10 with said fingers being initially formed in a common plane with and extending generally transversely to said bridge.

13. The method of claim 11 with said fingers being initially formed in a common plane with and extending generally transversely to said bridge.

14. The process of claim 10 further comprising the step of forming protrusion means at one axial end of said cage to preclude gripping of the nut by a wrenching tool at said one axial end.

15. In a laminated nut comprising a plurality of conical spring discs, a cage for receiving and holding said spring discs in a stacked, aligned relationship to define a central opening threaded to be matably received upon an associated threaded bolt, said cage including a bottom plate portion and a plurality of axially extending fingers cooperating with said plate portion to hold said spring discs in said stacked, aligned relationship, said spring discs having a plurality of circumferentially disposed flats, said laminated nut constructed by the process comprising the steps of:

providing a continuous strip of flat stock, forming a plurality of blanks connected together by a bridge of material, forming each blank to have said bottom plate portion with said fingers, folding said fingers to extend axially from said bottom plate portion, forming said spring discs to have at least two axially extending slots in different ones of said flats with said slots being of a depth sufficient to substantially fully receive the thickness of said fingers, locating said spring discs onto said bottom plate portion, moving said fingers in said slots with said fingers being substantially completely nested within said slots, folding the upper end of said fingers radially inwardly generally against the adjacent one of said disc springs to form retaining tabs holding said spring discs to said cage.

16. The method of claim 15 comprising the steps of severing said bridge after said upper ends of said fingers have been folded.

17. The method of claim 15 with said fingers being initially formed in a common plane with and extending generally transversely to said bridge.

18. The method of claim 16 with said fingers being initially formed in a common plane with and extending generally transversely to said bridge.

19. The process of claim 15 further comprising the step of forming protrusion means at one axial end of said cage to preclude gripping of the nut by a wrenching tool at said one axial end.

* * * * *

UNITED STATES PATENT AND TRADEMARK OFFICE
CERTIFICATE OF CORRECTION

PATENT NO. : 4,984,319

DATED : January 15, 1991

INVENTOR(S) : Richard L. Reynolds

It is certified that error appears in the above-identified patent and that said Letters Patent is hereby corrected as shown below:

```
Column 5, line 9, Claim 1, delete "a" and substitute
     therefor --said--.
Column 5, line 35, Claim 3, delete "a" and substitute
     therefor --said--.
Column 5, line 68, Claim 7, delete "a" and substitute
     therefor --said--.
Column 6, line 32, Claim 10, delete "a" and substitute
     therefor --said--.
```

Signed and Sealed this

Thirteenth Day of July, 1993

*Attest:*

MICHAEL K. KIRK

*Attesting Officer*     Acting Commissioner of Patents and Trademarks